(12) United States Patent
Sankaran et al.

(10) Patent No.: US 11,574,233 B2
(45) Date of Patent: Feb. 7, 2023

(54) SUGGESTION AND COMPLETION OF DEEP LEARNING MODELS FROM A CATALOG

(71) Applicant: International Business Machines Corporation, Armonk, NY (US)

(72) Inventors: Anush Sankaran, Bangalore (IN); Naveen Panwar, Bangalore (IN); Srikanth G. Tamilselvam, Bangalore (IN); Shreya Khare, Bangalore (IN); Rahul Aralikatte, Bangalore (IN); Senthil Kumar Kumarasamy Mani, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 669 days.

(21) Appl. No.: 16/117,922

(22) Filed: Aug. 30, 2018

(65) Prior Publication Data

US 2020/0074347 A1  Mar. 5, 2020

(51) Int. Cl.
*G06N 20/00* (2019.01)
*G06F 9/451* (2018.01)

(52) U.S. Cl.
CPC ............ *G06N 20/00* (2019.01); *G06F 9/451* (2018.02)

(58) Field of Classification Search
CPC ...... G06N 20/00; G06N 3/105; G06N 3/0445; G06N 3/0454; G06N 3/08; G06F 9/451
See application file for complete search history.

(56) References Cited

U.S. PATENT DOCUMENTS

| 9,449,283 | B1 | 9/2016 | Purpura et al. | |
| 2011/0225180 | A1* | 9/2011 | Liao | G06F 16/3322 707/769 |
| 2015/0339572 | A1* | 11/2015 | Achin | G06F 9/5011 706/46 |
| 2016/0055426 | A1 | 2/2016 | Aminzadeh et al. | |
| 2016/0110657 | A1* | 4/2016 | Gibiansky | G06N 20/00 706/12 |
| 2017/0286839 | A1 | 10/2017 | Parker | |

(Continued)

OTHER PUBLICATIONS

Chan et al., "Learning Network Architectures of Deep CNNs under Resource Constraints ." Proceedings of the IEEE pp. 1816-1823 (Jun. 2018) (Year: 2018).*

(Continued)

*Primary Examiner* — Kamran Afshar
*Assistant Examiner* — Ryan C Vaughn
(74) *Attorney, Agent, or Firm* — Ryan, Mason & Lewis, LLP

(57) ABSTRACT

Techniques for the suggestion and completion of deep learning models are disclosed including receiving a set of data and determining at least one property of the data. A plurality of characteristics of a computing device and a plurality of deep learning models are received and a score for each of the plurality of deep learning models is determined based on the received computing device characteristics and the determined at least one property of the data. The plurality of deep learning models are ranked for presentation to a user based on the determined scores. One or more of the deep learning models are presented on a display based on the ranking. A selection of one of the deep learning models is received and the selected deep learning model is trained using the set of data.

20 Claims, 12 Drawing Sheets

(56) References Cited

U.S. PATENT DOCUMENTS

2019/0156178 A1\* 5/2019 Thornton ................. G06N 3/04
2019/0362222 A1\* 11/2019 Chen ...................... G06N 20/00
2020/0184262 A1\* 6/2020 Chui .................... G06K 9/6256

OTHER PUBLICATIONS algorithmia.com, "Deploy and Manage ML Models the Smart Way," http://algorithmia.com/, downloaded Sep. 2018, 13 pages.
Deep Cognition, "Visual Editor and Code IDE," http://deepcognition.ai/, downloaded Sep. 2018, 10 pages.

\* cited by examiner

SUGGESTION AND COMPLETION OF DEEP LEARNING MODELS FROM A CATALOG

FIELD

The present application generally relates to machine learning, and, more particularly, to the suggestion and completion of deep learning models.

BACKGROUND

The construction of a deep learning model for a set of target data is often a complex task. For example, each deep learning model may be constructed according to a variety of parameters such as a number of nodes, number of layers, number of nodes per layer, types of layers, or other similar parameters. These parameters are typically selected based on a manual analysis of the task at hand and the data set to be used for training the model.

SUMMARY

In one embodiment of the present invention, techniques for the suggestion and completion of deep learning models are provided. An exemplary computer-implemented method can include steps of receiving a set of data and determining at least one property of the data. A plurality of characteristics of a computing device associated with a user and a plurality of deep learning models from a catalog of deep learning models are received. A score for each of the plurality of deep learning models is determined based on the received computing device characteristics and the determined at least one property of the data and the plurality of deep learning models are ranked for presentation to a user based on the determined scores. One or more of the deep learning models are presented to a user on a display of the computing device associated with the user based on the ranking. A selection of one of the deep learning models is received from the user via an input device of the computing device associated with the user and the selected deep learning model is trained using the set of data.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

The construction of a deep learning model for a set of target data is often a complex task. There is a significant challenge in deciding which deep learning model architecture will yield the best results for the target data. For example, selecting configuration parameters for a deep learning model may involve substantial manual effort on the part of a user. For example, while setting up a deep learning model architecture, the user may be required to select the number of nodes, layers, or other parameters. Selecting the best or ideal number of nodes, layers, and other parameters for a particular task is often a complex process. For example, users often go back and forth testing different numbers of nodes, layers, and other parameters and perform a brute force search to identify the best configuration parameters. This may require the user to train multiple different deep learning models with different architectures and configurations of nodes, layers, and parameters on the same target data to determine which model is the best fit for the target data. This excessive training may be highly time intensive and very costly with respect to the requirements of computational resources such as, e.g., computer processing units (CPUs), graphics processing units (GPUs), and memory.

Such brute force selection and training does not take into account the characteristics of a computing device that will implement the deep learning model, characteristics of the target data, characteristics specific to each deep learning architecture, or other similar information.

The techniques for the suggestion and completion of deep learning models disclosed herein assist a user in the construction of a deep learning model in a quick and easy manner that also may take into account various attributes, properties, characteristics, or parameters associated with the set of data, the computing device that will implement the model, and the model itself.

Figure 1:
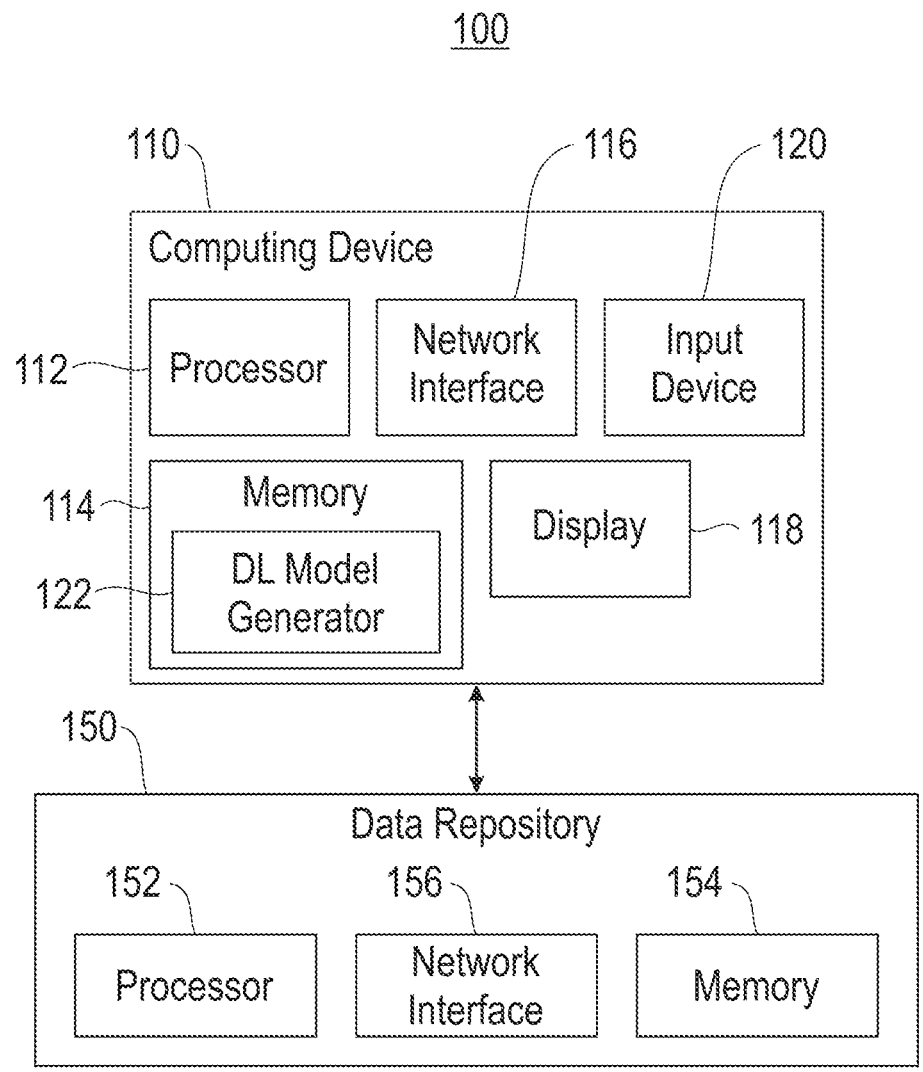
FIG. 1 is a diagram illustrating system architecture, according to an exemplary embodiment of the invention.

With reference now to FIG. 1, an embodiment of a system architecture 100 for construction of a deep learning model is illustrated. In some embodiments, system 100 includes a computing device 110, and a data repository 150.

Computing device 110 includes at least one processor 112, memory 114, at least one network interface 116, a display 118, an input device 120, and may include any other features commonly found in a computing device. In some embodiments, computing device 110 may include, for example, a personal computer, workstation, laptop, tablet, smart device, smart phone, smart watch, or any other similar computing device that may be used by a user.

Processor 112 may include, for example, a central processing unit (CPU), a microcontroller, Field Programmable Gate Array (FPGA), or any other form of processing circuitry that is configured to perform various operations. Processor 112 may be configured to execute instructions as described below. These instructions may be stored, for example, in memory 114. As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Memory 114 may include, for example, computer readable media or computer readable storage media in the form of volatile memory, such as random-access memory (RAM) and/or cache memory or others. Memory 114 may include, for example, other removable/non-removable, volatile/non-volatile storage media. By way of non-limiting examples only, memory 114 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

In some embodiments, computer software including instructions or code for performing the methodologies of the invention, as described herein, may be stored in associated memory 114 and, when ready to be utilized, loaded in part or in whole (for example, into RAM) and implemented by processor 112. Such software could include, but is not limited to, firmware, resident software, microcode, and the like. The memory 114 may include local memory employed during actual implementation of the program code, bulk storage, and cache memories which provide temporary storage of at least some program code in order to reduce the number of times code must be retrieved from bulk storage during implementation.

In some embodiments, computing device 110 may include a deep learning (DL) model generator 122, e.g., computer software instructions or code, stored in memory 114 that is configured to assist a user by suggesting and completing a deep learning model as will be described in more detail below. In some embodiments, DL model generator 122 may alternatively be stored remote from computing device 110, e.g., on a server or other system. For example, computing device 110 may access or execute DL model generator 122 to assist a user in generating a deep learning model. In some embodiments, DL model generator 122 may be an application programming interface (API) that is activatable or executable by computing device 110 to offload the suggestion and completion of the deep learning model to a remote processing center, e.g., a server or other similar system.

Network interface 116 is configured to transmit and receive data or information to and from a data repository 150 or any other server, component, or computing device via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE), near-field communications systems, satellite communications, via a local area network (LAN), via a wide area network (WAN), or any other form of communication that allows computing device 110 to transmit or receive information to or from data repository 150 including components of data repository 150.

Display 118 may include any display device that is configured to display information to a user of computing device 110. For example, in some embodiments, display 118 may include a computer monitor, television, smart television, or other similar displays. In some embodiments, display 118 may be integrated into or associated with computing device 110, for example, as a display of a laptop, smart phone, smart watch, or other smart wearable devices, as a virtual reality headset associated with computing device 110, or any other mechanism for displaying information to a user. In some embodiments, display 118 may include, for example, a liquid crystal display (LCD), an e-paper/e-ink display, an organic LED (OLED) display, or other similar display technologies. In some embodiments, display 118 may be touch-sensitive and may also function as an input device 120.

Input device 120 may include, for example, a keyboard, a mouse, a touch-sensitive display 118, a keypad, a microphone, or other similar input devices or any other input devices that may be used alone or together to provide a user with the capability to interact with computing device 110.

Data repository 150 may include, for example, a processor 152, memory 154, and a network interface 156 that may include similar functionality as processor 112, memory 114, and network interface 116. In some embodiments, data repository 150 may, for example, be any computing device, server, database or similar system, or any combination thereof, that is configured to interact with or provide data to computing device 110. In some embodiments, for example, data repository 150 may include a distributed storage system including a plurality of servers, databases, or other components. In some embodiments, the data stored in data repository 150 may alternatively be stored in memory 114 of computing device 110 for use by computing device 110 such that no connection to a data repository 150 may be necessary to obtain the data.

Figure 2:
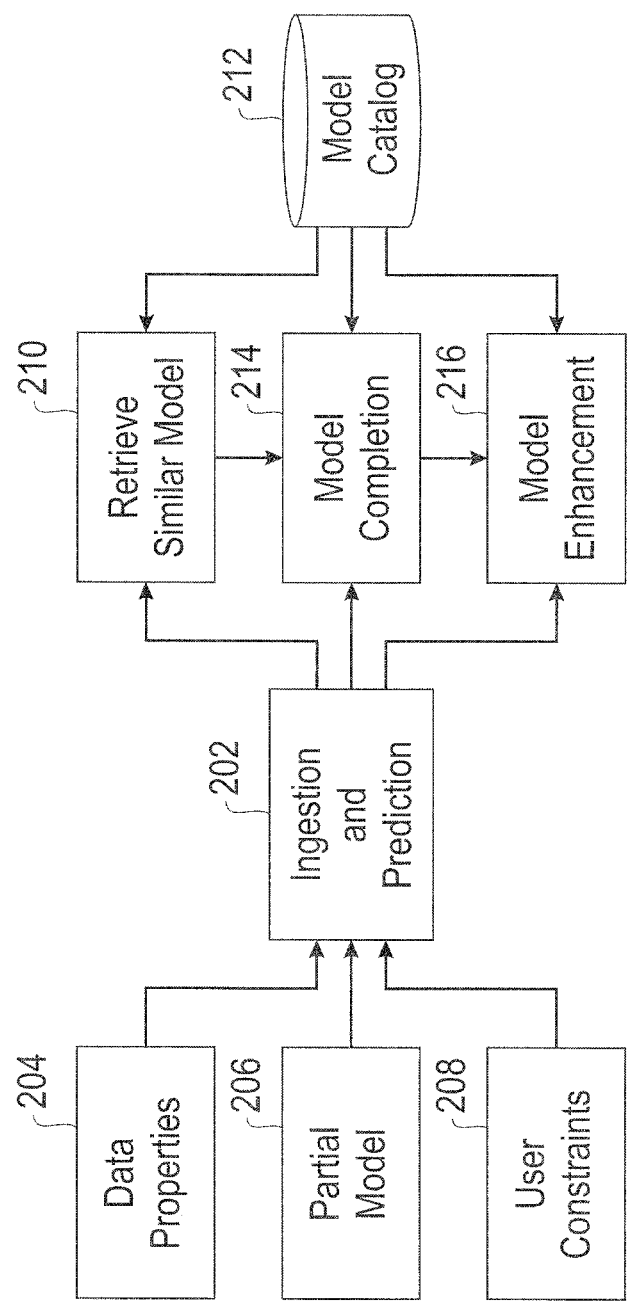
FIG. 2 is a diagram illustrating techniques and components of a deep learning model generator according to an embodiment of the invention.

FIG. 2 is a high-level flow diagram illustrating a method implemented by DL model generator 122 according to an illustrative embodiment.

At 202, DL model generator 122 ingests data and using the data, predicts the most suitable deep learning model from a catalog of models.

In some embodiments, the ingested data may include data properties 204 of a set of data to be used to train a selected deep learning model. In some embodiments, the set of data may be analyzed to determine the data properties 204. For example, the set of data may be analyzed to determine a distribution of the data.

In some embodiments, the ingested data may include a partial model 206. For example, the partial model 206 may have been built for the set of training data but not completed. In some embodiments, the partial model may have been built by another program. In some embodiments, no partial model has been generated.

In some embodiments, the ingested data may include user constraints 208.

In some embodiments, user constraints 208 may include, for example, the available compute resources. For example, user constraints 208 may include an indication of the availability of CPUs, GPUs, memory, or other compute resources. As an example, the user constraints 208 may indicate how much load the CPUs, GPUs, and memory are under and what portion of the CPUs, GPUs, and memory are available for use by the deep learning model. In a GPU cluster, for example, the number of available GPUs may be indicated in the user constraints 208.

In some embodiments, user constraints 208 may specify a maximum memory size of the model. For example, each deep learning model requires a specific GB of memory in GPU. The user constraints 208 may specify the upper bound of memory consumption by a deep learning model to control compute resource usage.

In some embodiments, user constraints 208 may specify a maximum training time for a deep learning model. For example, user constraints 208 may specify the maximum training time that a model can take for training.

In some embodiments, user constraints 208 may specify expected performance bounds. For example, the expected performance bounds may be the minimum and maximum bounds on the expected performance (accuracy) of the deep learning model for the given target data.

At 210, a plurality of deep learning models may be retrieved or obtained from a model catalog 212, e.g., a model catalog stored in memory 114 of computing device 110 or in memory 154 of data repository 150. In some embodiments, the models may be obtained based on the data properties 204, partial model 206, and user constraints 208. For example, in some embodiments, only those models matching the data properties 204, partial model 206, and user constraints 208 may be obtained. In some embodiments, the models may be obtained first, and sorted or ranked based on the data properties 204, partial model 206, and user constraints 208.

At 214, the deep learning model may be completed, for example, as described below with reference to FIGS. 3-10.

At 216, the deep learning model may be enhanced. For example, the given deep learning model may contain design shortcomings and may provide poor performance on the given target data. Enhancements may include, e.g., suggestions such as layer addition, layer deletion, chaining one or more configuration parameters, or other similar enhancements that may improve the model for the given target data. In some embodiments, these suggested changes may be suggested based on the most similar retrieved model from the catalog.

With reference now to FIGS. 3-6, a method implemented by DL model generator 122 according to an illustrative embodiment will now be described.

At 302, DL model generator 122 may obtain data for generating a list of deep learning models. For example, DL model generator 122 may obtain a data type 304, data task 306, and metric 308.

Figure 4:
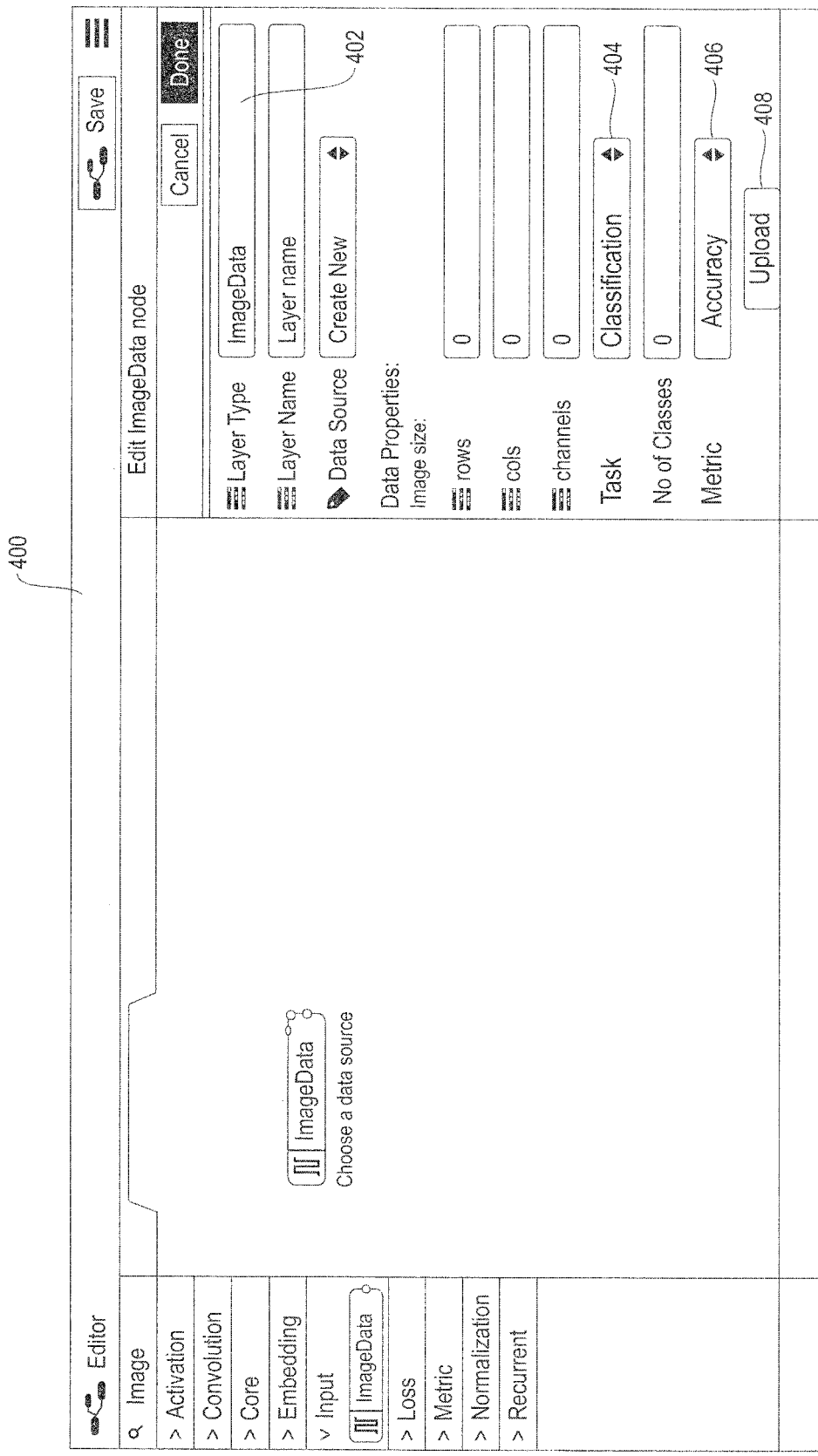
FIGS. 4-6 illustrate an example graphical user interface according to the embodiment of FIG. 3.

As illustrated in FIG. 4, for example, DL model generator 122 may present a graphical user interface (GUI) 400 to a user via display 118. The graphical user interface may include one or more elements that are activatable by the user to input the data, e.g., via input device.

In some illustrative embodiments, GUI 400 may include a data type element 402 corresponding to data type 304 that may be activated by the user to specify a data type 304 for the data set. For example, as illustrated in FIG. 4, the data type element 402 may be activated by the user to set the data type to image data. While described herein with reference to image data, any other data may be used including, for example, textual data, video data, audio data, categorical data, sensor signals, any other structured or unstructured, or any other type of data that may be used to train a deep learning model or may be ingested for processing by a trained deep learning model.

In some illustrative embodiments, GUI 400 may include a data task element 404 corresponding to data task 306 that may be activated by the user to specify a data task 306 to be performed for the data set. For example, as illustrated in FIG. 4, the data task element 404 may be activated by the user to set the data task to classification. While described herein with reference to a classification task, data task element 404 may be set to any other task. For example, for image data, some non-limiting examples of tasks may include classification, generation, segmentation, enhancement, and translation. As another example, for text data, some non-limiting examples of tasks may include classification, generation, tagging, noise removal, and translation. As another example, for speech or audio data, some non-limiting examples of tasks may include classification, diarization, translation, and segmentation. Additional examples of tasks may include computer vision, speech recognition, natural language processing, audio recognition, filtering, machine translation, or any other type of task for which a deep learning model may be used. Any of the tasks set forth above as examples for a particular data type may be used for any other type of data. In some embodiments, a multi-modal data task 306 may be applied to data that includes more than one type of data. For example, a video may include both image and audio components that may require processing by the deep learning model.

In some illustrative embodiments, GUI 400 may include a metric element 406 corresponding to metric 308 that may be activated by the user to specify a metric 308 to be used for the deep learning model. For example, as illustrated in FIG. 4, the metric element 406 may be activated by the user to set the metric to accuracy. While described herein with reference to an accuracy metric, metric element 406 may be set to any other metric including, for example, recall, sensitivity, true positive rate, specificity, true negative rate, precision, false positive rate, false negative rate, mean squared error, or any other type of metric that may be used to assess the performance of a deep learning model.

While the data type 304, data task 306, and metric 308 are described above as being obtained via user input from GUI 400, data type 304, data task 306, and metric 308 may be obtained in any other manner. For example, the data type 304, data task 306, and metric 308 may be pre-determined and stored in memory.

In addition to obtaining data from the user activated elements in GUI 400, DL model generator 122 may also obtain the plurality of deep learning models from deep learning model catalog 310. For example, the deep learning model catalog 310 may be stored in memory 114 of computing device 110 or the deep learning model catalog 310 may be stored in memory 154 of a data repository 150 and may be obtained by DL model generator 122 from the data repository 150. In some embodiments, the deep learning model catalog 310 may be stored in any other location.

At 312, DL model generator 122 may generate an initial list of models based on the obtained data type 304, data task 306, metric 308, and the plurality of deep learning modes obtained from the model catalog 310. For example, a subset of the plurality of deep learning models that meet the obtained data type 304, data task 306, and metric 308 may be added to the initial list of models. For example, a deep learning model that can process image data, perform classification on the image data, and provide an accuracy metric may be added to the initial list of models.

At 314, DL model generator 122 may obtain a data set 314, e.g., a data set for use with a deep learning model. In some illustrative embodiments, for example, GUI 400 may include an upload element 408 that may be activated by the user to upload a data set 314 to be used for the deep learning model. For example, as illustrated in FIG. 4, the upload element 408 may be activated by the user to select the data set 314 to be uploaded, e.g., image data in this case.

At 316, DL model generator 122 may obtain or detect compute capabilities of a computing device 110 associated with the user. For example, in some embodiments, the characteristics of the computing device 110 may be analyzed to determine compute capabilities including, for example, maximum available central processing unit (CPU) speed, maximum available graphics processing unit (GPU) speed, maximum available speed and size of volatile and non-volatile memory, or other characteristics of the computing device 110 that will implement the deep learning model. For example, DL model generator 122 may perform a processor, memory or other test on the computing device 110 to determine the characteristics of the computing device. In some embodiments, the characteristics of the computing device 110 may be obtained by DL model generator 122 from computing device 110 without performing a test, for example, from the system settings of the computing device 110.

At 318, DL model generator 122 may filter the initial list of models generated at 312 based on the data set 314 and obtained characteristics of the computing device 110. For example, model requirements for a given deep learning model in the initial list of models may be compared to the characteristics of the computing device 110. In some embodiments, deep learning models having requirements that are not met by computing device 110 may be removed from the initial list of models.

In some embodiments, for example, a maximum memory size required for the given model may be compared to the available amount of memory of the computing device 110 to determine whether the computing device 110 includes sufficient memory to implement the given model. In some embodiments, any models which require more memory than the available memory of computing device 110 may be removed from the list.

In some embodiments, for example, minimum and maximum performance bounds for the given model may be compared to the obtained characteristics of the computing device 110 to determine whether computing device 110 can provide sufficient performance to meet the minimum and maximum performance bounds of the given model. In some embodiments, any models for which the characteristics of the computing device 110 are outside of the minimum and maximum performance bounds may be removed from the list.

In some embodiments, for example, a maximum amount of time to train one epoch requirement of the given model may be compared to the characteristics of the computing device 110 to determine whether the computing device 110 is capable of training one epoch within the maximum amount of time. In some embodiments, any model for which the computing device 110 is not capable of meeting the maximum amount of time to train one epoch may be removed from the list.

In some embodiments, for example, a maximum GPU availability required for the given model may be compared to the GPU availability of the computing device to determine whether the computing device 110 includes sufficient GPU availability to implement the given model. In some embodiments, any model for which the computing device does not include sufficient GPU availability may be removed from the list.

At 320, a natural language explanation and a reasoning is provided to a user based on the filtering of 318, e.g., via GUI 400, as to why a particular model is retrieved from the catalog for the given input data and constraints. For example, as described in more detail below, an interface element 412 (FIG. 6) may provide the natural language explanation for a selected deep learning model. For example, the interface element 412 may present a natural language explanation as 1. Retrieved model when trained on MNIST data provided 99% accuracy; 2. Distribution correlation between the actual train data and provided target data is 0.93; 3. Total memory consumption of the model is 4 GB for training; and 4. One epoch of training of the model will take <4 mins in K40 GPU, as illustrated in FIG. 4.

At 322, in some embodiments, the DL model generator 122 may generate scores for any remaining deep learning models in the list of models after the filtering based on the characteristics of the computing device 110. For example, in some embodiments, a score may be generated for a given deep learning model based on the characteristics of the computing device 110. For example, each characteristic may be encoded using an encoding algorithm $ec_i = f_i(c_i)$ where the score is denoted by $ec_i$, the algorithm is denoted by $f_i(\ )$, and the characteristic is denoted by $c_i$. The algorithm may change depending on the particular characteristic involved.

For example, if the GPU memory required by a given deep learning model is 6 GB, the score, $ec_i$, for GPU utilization may be determined based on an algorithm $f_i(\ )$ of $$\frac{1}{c_i - 6}.$$

If, in this example, the GPU availability of the computing device 110 is 8 GB, the score $ec_i$ for GPU utilization may be $$\frac{1}{8 - 6},$$

or 0.5.

As another example, if the GPU time required by a given deep learning model for executing one epoch of the given deep learning model is 12 minutes, the score, $ec_i$, for GPU time, may be determined based on an algorithm $f_i(\ )$ of $$\frac{c_i - 12}{240}.$$

If, in this example, the GPU availability of the computing device 110 is 4 hours (240 minutes), the score $ec_i$ for GPU time may be $$\frac{240 - 12}{240},$$

or 0.95, which is the maximum epoch score.

At 324, DL model generator 122 may obtain data from a data catalog including a collection of different datasets, e.g., image, text, audio, video, etc., that are used to train deep learning models.

At 326, DL model generator 122 may filter the initial list of models generated at 312 based on the obtained data set 314 and the data distribution obtained at 324. For example, data distribution requirements for a given deep learning model in the initial list of models may be compared to the data distribution of the data set to determine whether the data distribution of the data set meets the data distribution requirements of the given deep learning model. In some embodiments, any model having a required data distribution that is not met by the data distribution of the data set may be removed from the list.

At 320, a natural language explanation and a reasoning is provided to a user based on the filtering of 326, e.g., via GUI 400, as to why a particular model is retrieved from the catalog for the given input data and constraints in a similar manner to that described above for step 320.

At 328, in some embodiments, the DL model generator 122 may generate scores for any remaining deep learning models in the list of models after the filtering based on the data distribution of the data set. For example, in some embodiments, a score may be generated for a given deep learning model based on the data distribution of the data set. For example, the data distribution of the data set may be encoded using an encoding algorithm $ex_i=f_i(x_i)$ where the score is denoted by $ex_i$, the algorithm is denoted by $f_i()$, and the data distribution is denoted by $x_i$. The algorithm may change depending on the particular data distribution involved.

For example, if the model data distribution is $P(X2)$, the score, $ex_i$, for the data distribution may be determined based on an algorithm $f_i()$ of $corr(P(x_i), P(X2))$. If, in this example, the data distribution of the data set is $P(X)$, the score $ex_i$ for the data distribution may be $corr(P(X), P(X2))$, or 0.8.

In some embodiments, the DL model generator 122 may also generate scores based on the model and task parameters. For example, in some embodiments, a score may be generated for a given deep learning model based on the model and task parameters associated with the given model and obtained from the user. For example, the model and task parameters may be encoded using an encoding algorithm $ey_i=f_i(y_i)$ where the score is denoted by $y_i$, the algorithm is denoted by $f_i()$, and the data distribution is denoted by $y_i$. The algorithm may change depending on the particular model and task parameters involved.

For example, if the model and task parameter is accuracy, the score, $ey_i$, for the model and task parameter may be determined based on an algorithm $f_i(given\_accuracy)$ of $$\frac{(max\_accuracy - given\_accuracy)}{min\_accuracy}.$$

If, in this example, the model and task parameter is output_shape, the score $ey_i$ for the model and task parameters may be determined based on an algorithm $f_i(output\_shape, catalog\_layer\_shape)$ of distance $(output\_shape, catalog\_shape)$.

At 330, the respective scores for each given deep learning model are combined to form a combined score list of models. For example, all of the encoded parameters for a given deep learning model may be concatenated into a final score ef where ef={ec, ex, ey}. In some embodiments, for example, a linear weighted regression $\Sigma w_i * ef_i$ may be performed on the combination of scores where $w_i$ is the weight. The output of the regression may be the score for a given deep learning model.

As an example, where the score for GPU utilization of the given deep learning model is 0.5, the score for maximum epoch time of the given deep learning model is 0.95, and the score for the data distribution of the given deep learning model is 0.8, the final score ef may be determined as w1*0.5+w2*0.95+w3*0.8 where w1, w2, and w3 are the respective weights for each score. For example, if w1, w2, and w3 are the same, the final score is 0.75. In some embodiments, the weights for each score may be equal by default. In some embodiments, the weights for each score may be obtained from a user input, e.g., via input device 120.

In some embodiments, the final scores for each of the deep learning models may be used to sort and rank the deep learning models. For example, a first deep learning model having a score that is higher than a second deep learning model may be ranked higher than the second deep learning model.

In some embodiments, DL model generator 122 may also compare the final score for each deep learning model to a predetermined threshold value to determine whether the deep learning model should be included in the sorted and ranked list of deep learning models to be presented to the user. For example, if a given deep learning model has a final score that is less than the predetermined threshold, the given deep learning model may be removed from the list. For example, if the predetermined threshold is 0.75 and a given deep learning model has a final score of 0.57, the given deep learning model may be removed from the list. In alternative embodiments, no comparison to a predetermined threshold may be performed and instead all remaining deep learning models may be sorted and ranked based on the final score.

Figure 5:
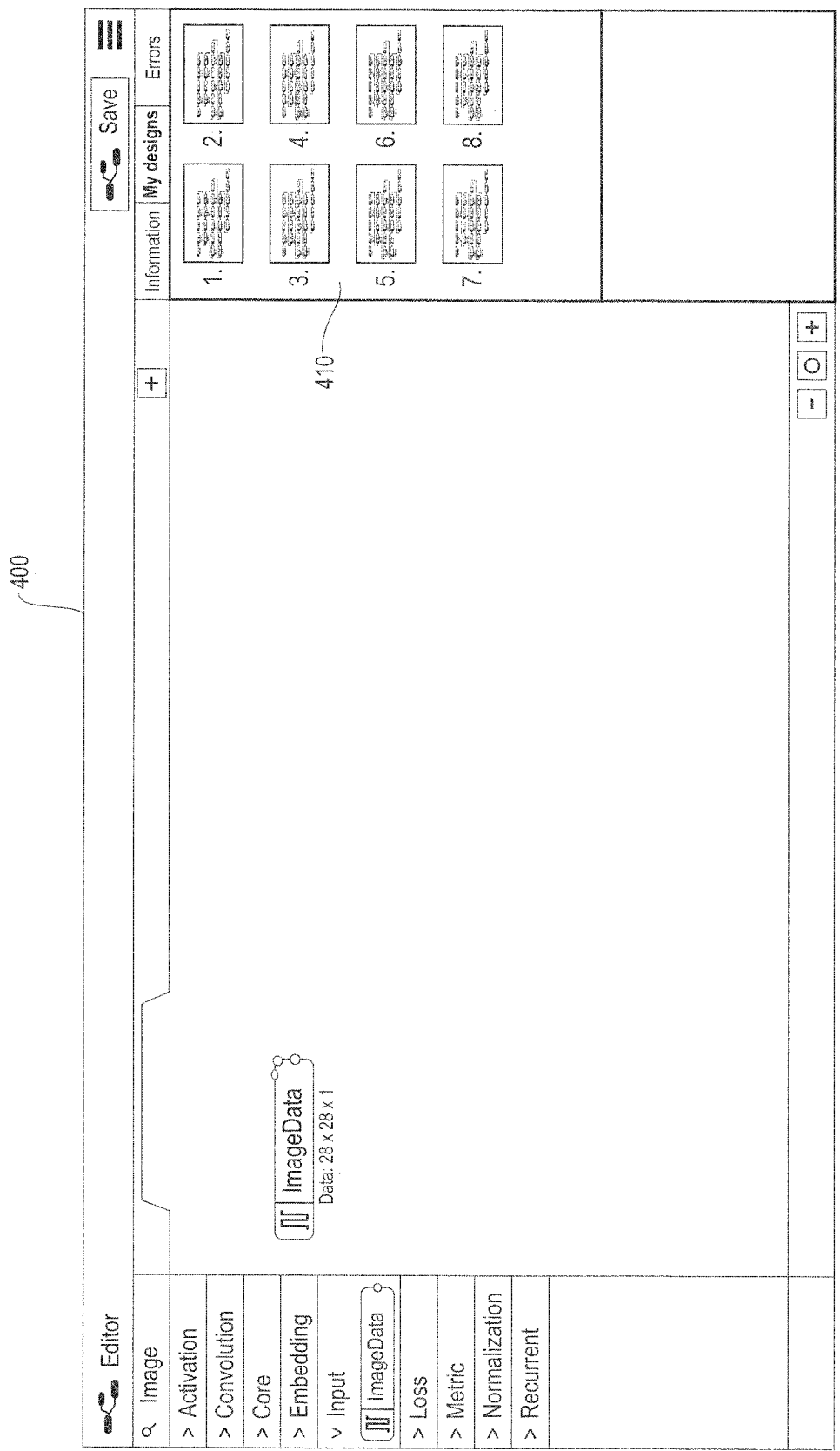

With reference now to FIG. 5, DL model generator 122 may present the sorted and ranked deep learning models to the user via GUI 400. For example, in some embodiments, the deep learning models having the highest final scores may be presented, e.g., as deep learning models 1-8 in an interface element 410. Deep learning models 1-8 are ranked and presented in an order according to their respective scores in interface element 410 where, for example, deep learning model 1 has a higher score than deep learning model 2, deep learning model 2 has a higher score than deep learning model 3, . . . , and deep learning model 7 has a higher score than deep learning model 8. In some embodiments, a user may activate interface element 410 to scroll through the list of deep learning models to see additional deep learning models, e.g., those that do not have the top 8 final scores. While 8 deep learning models are presented in interface element 410 in the illustrative embodiment, any other number of deep learning models may be presented. For example, in some embodiments only the top scoring deep learning model may be presented. In some embodiments each deep learning model in the final list may be presented.

Figure 6:
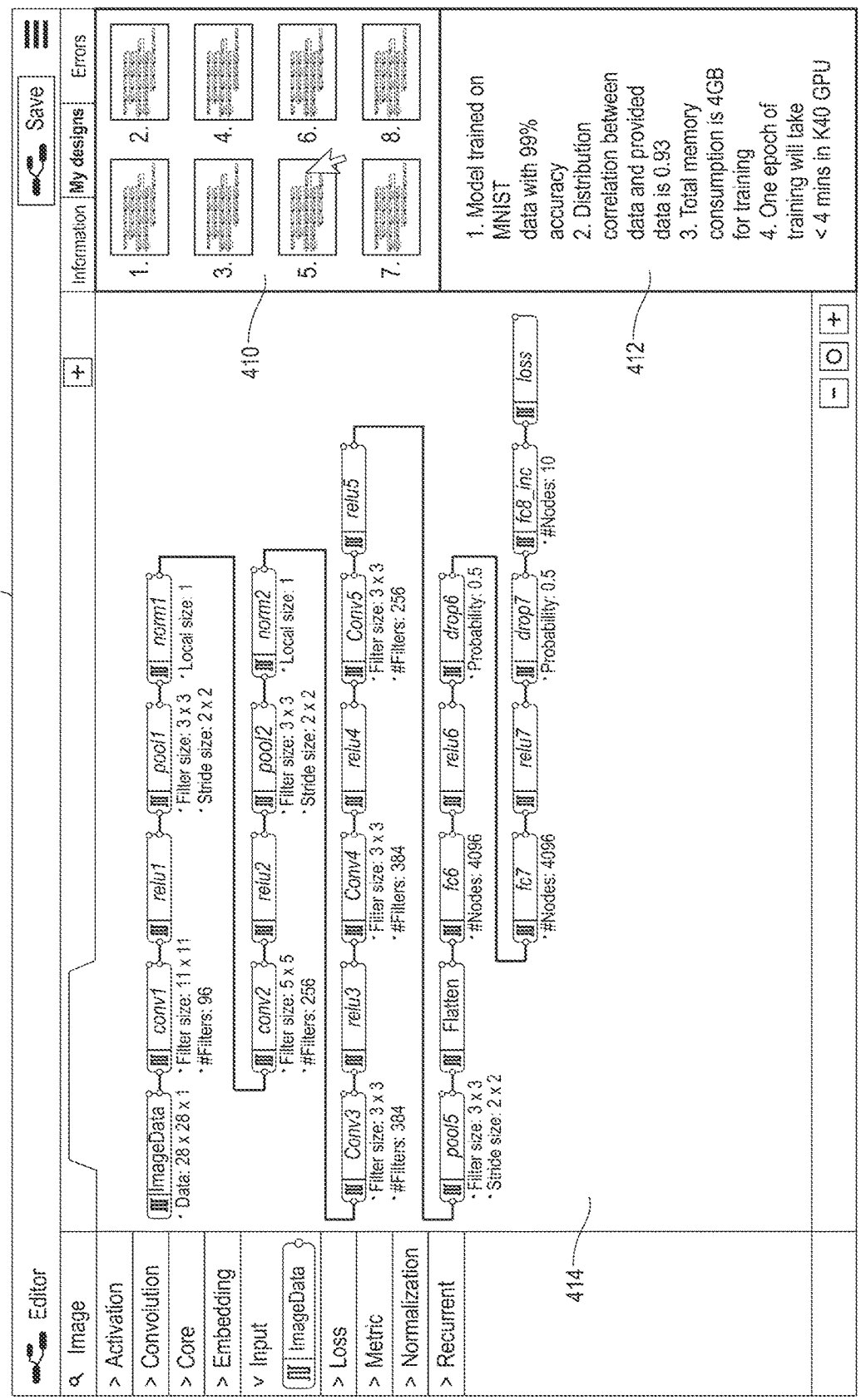

With reference now to FIG. 6, a user may activate or hover over a given deep learning model, e.g., deep learning model number 5, to see more information about the given deep learning model. For example, an information interface element 412 of GUI 400 may present the user with attributes or requirements for the given model. For example, in some embodiments, information interface element 412 may present the user with data associated with the selected data type 304, data task 306, and metric 308 for the given model. For example, as illustrated in the FIG. 6, information interface element 412 may indicate that the model has an accuracy of 99%, the correlation between the data distribution of the data set and the data distribution of the given model is 0.93, the total memory consumption for the given model is 4 GB, and that one epoch of training will take less than 4 minutes in the K40 GPU, e.g., the type of GPU identified in the obtained characteristics of the computing device 110.

In some embodiments, when a given deep learning model is activated or hovered over in interface 410, DL model generator 122 may present an example of the components of the given deep learning model in an interface 414 of GUI 400. For example, interface 414 may present each component or layer of the given deep learning model and additional parameters for the components as illustrated, for example in FIG. 4. For example, interface 414 may present parameters for components such as, filter sizes, number of filters, number of nodes, probability settings, or other similar parameters of the given deep learning model.

Once the user selects a deep learning model from interface 410 for use with the data set, DL model generator 122 may generate the deep learning model and initiate training of the deep learning model based on the ingested data set 314, the input data type 304, data task 306, and metric 308.

The disclosed techniques enhance and simplify a user's construction of a deep learning model for a particular data set according to obtained parameters such as data types 304, data tasks 306, and metrics 308, according to characteristics of the user's computing device, and properties of the data set itself, by analyzing, scoring, and ranking each deep learning model for its "fit" to the data set, characteristics, and parameters. The scoring and ranking take into account a variety of factors and allows a user to quickly and efficiently determine which deep learning model to implement for the data set. The disclosed techniques also present a graphical user interface that provides the user with an easy to use manner in which to select a deep learning model based on the scoring and ranking of the deep learning models.

With reference now to FIGS. 7-10, a method implemented by DL model generator 122 according to another illustrative embodiment will now be described.

Figure 3:
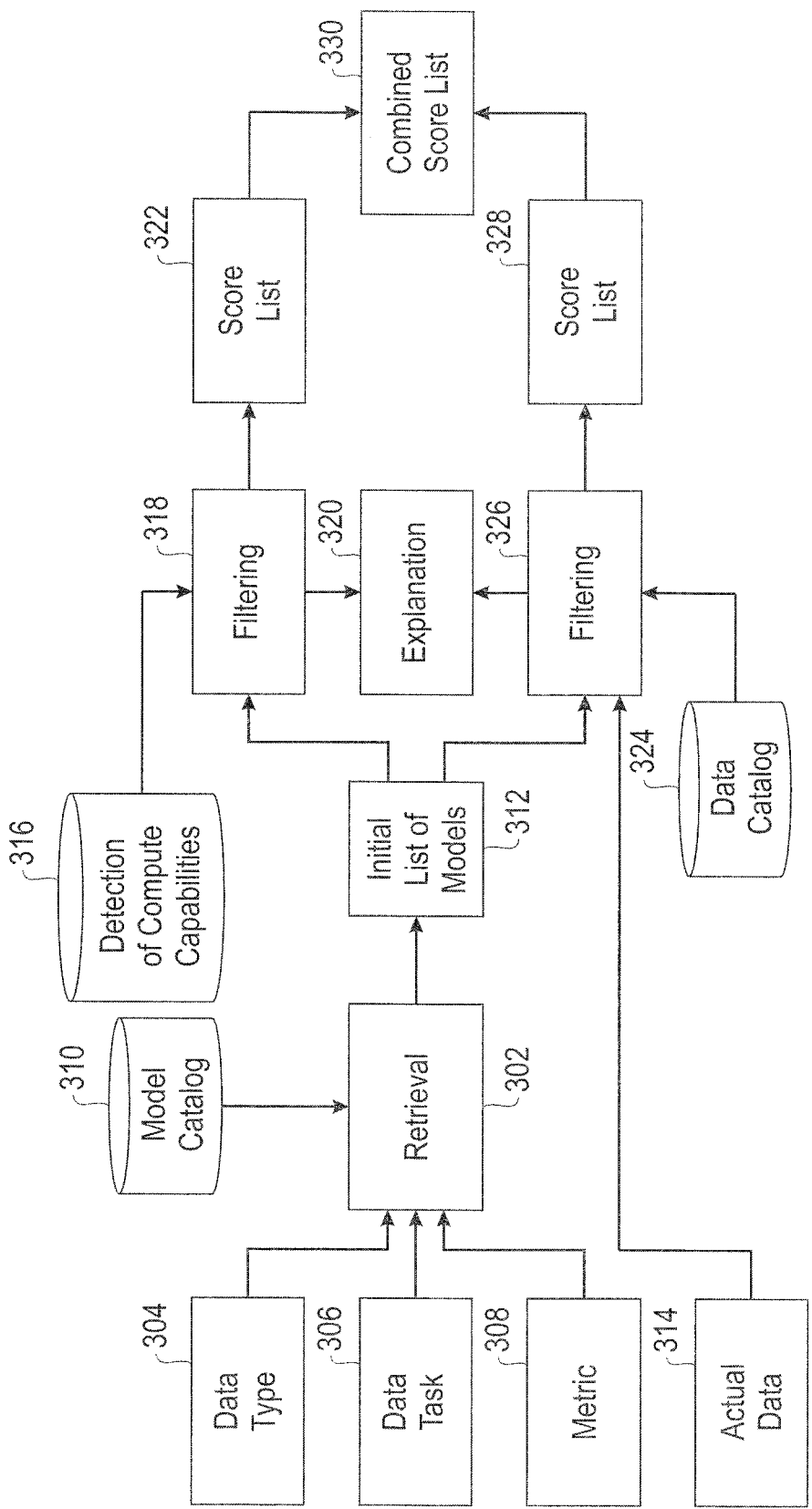
FIG. 3 is a flow diagram illustrating techniques according to an embodiment of the invention.
Figure 7:
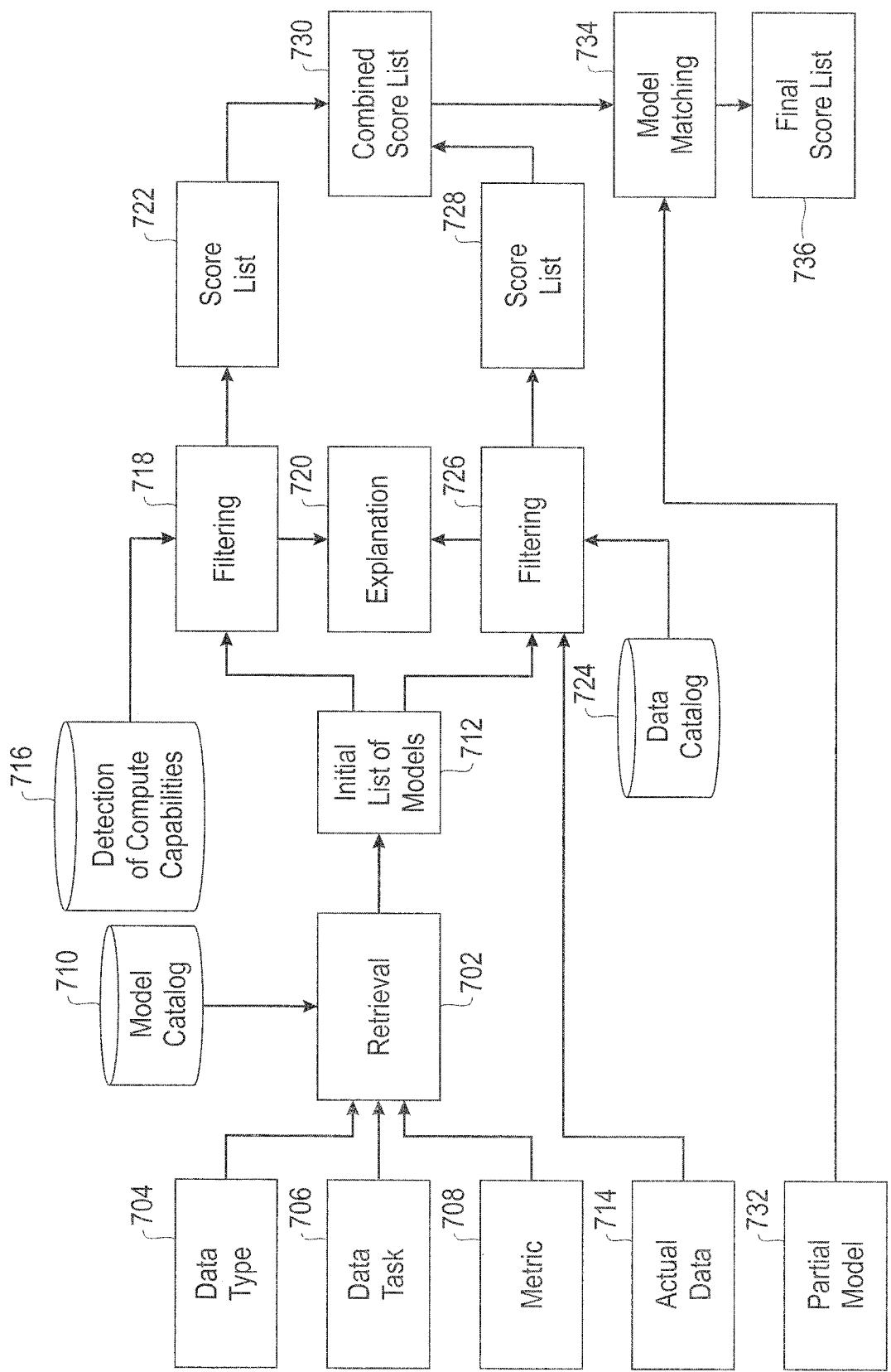
FIG. 7 is a flow diagram illustrating techniques according to another embodiment of the invention.

In some embodiments, the method according to the illustrative embodiment of FIG. 7 may perform at least some of the same steps as the method of FIG. 3. For example, steps 702-730 of the embodiment of FIG. 7 may be the same as steps 302-330 of the embodiment of FIG. 3, as described above. The embodiment of FIG. 7 may extend the embodiment of FIG. 3 as will be described below.

Figure 8:
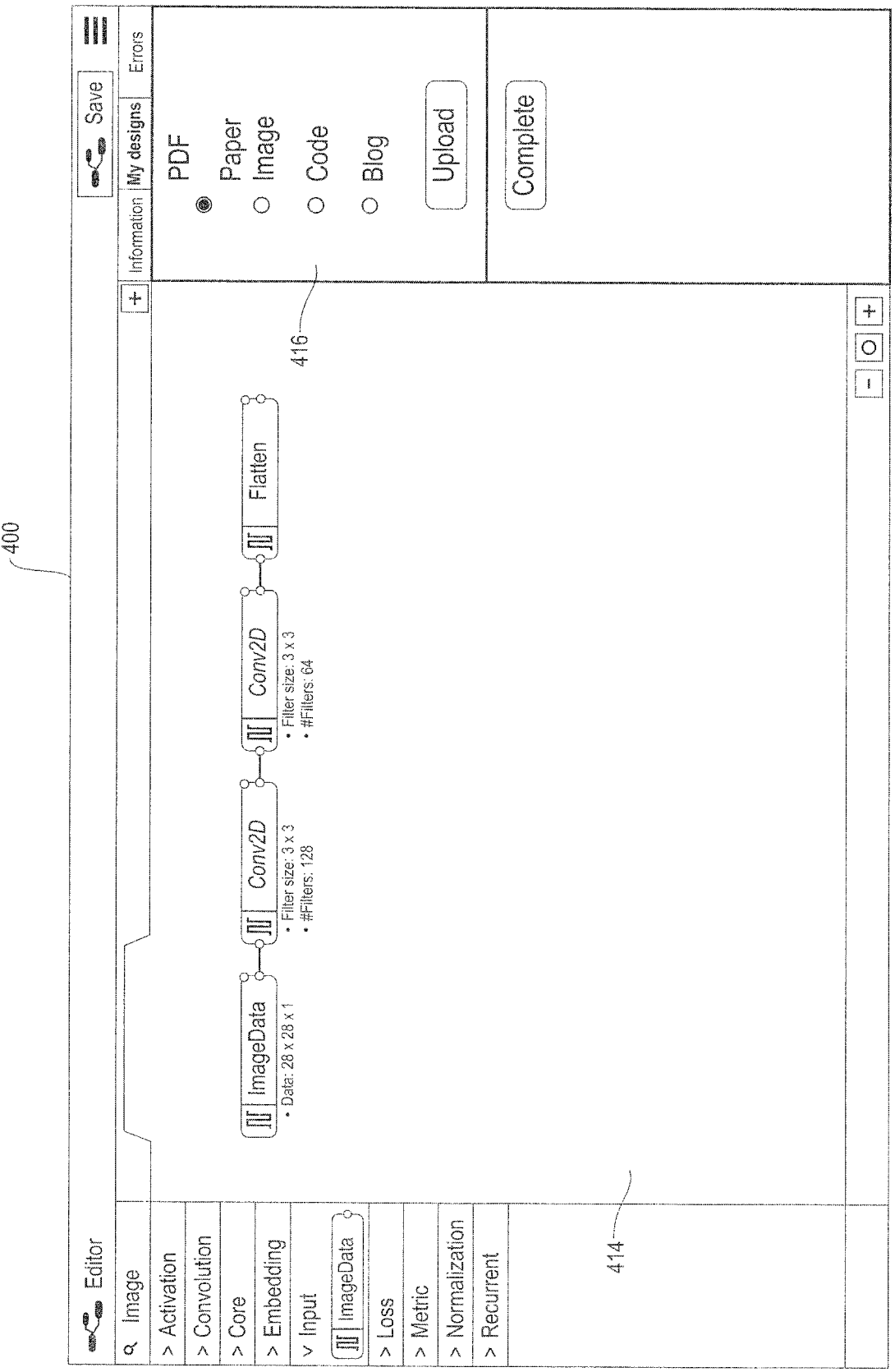
FIGS. 8-10 illustrate an example graphical user interface according to the embodiment of FIG. 7.

At 732, a partial model may be obtained, for example, via user input. For example, as illustrated in FIG. 8, GUI 400 may include an interface 416 including elements that are activatable by the user, e.g., via input device 120, to upload a partial model. For example, as illustrated in FIG. 8, the partial model may include two convolutional layers and a flatten layer. In some embodiments, the partial model may be obtained, for example, in a design json format, as an image of the design, a PDF of a research paper containing the design, partially written code, a link to a blog explaining the model, or in any other format that may be used as a partial model by DL model generator 122.

At 734, DL model generator 122 may match the partial model to models in the final list generated at 730. For example, in addition to the scoring of the deep learning models at 730, further comparison may be made to the partial model obtained at 732 to determine which models may both complete the partial model and have the highest scores. In some embodiments, the obtained partial model may be presented in interface 414. In some embodiments, deep learning models that do not match the partial model may be removed from the score list.

At 736, a final score for each remaining deep learning model is determined based on the comparison with the partial model obtained at 732 and a final score list is generated. For example, in some embodiments, a graph bipartite algorithm may provide a score for the partial model with respect to the full model. This score for the partial model may be concatenated as one or more terms to the linear regression as described above to generate the final score. The remaining deep learning models are sorted and ranked based on the final score as described above. In some embodiments, for example, the comparison of the partial model to the deep learning models in the score list may generate a score for each deep learning model that may be used as an encoded parameter for concatenation into the final score in addition to the computing device characteristics scores, data distribution scores, and model and task parameter scores as described above. Any other partial graph matching algorithm for determining a score for partial model a may be used.

Figure 9:
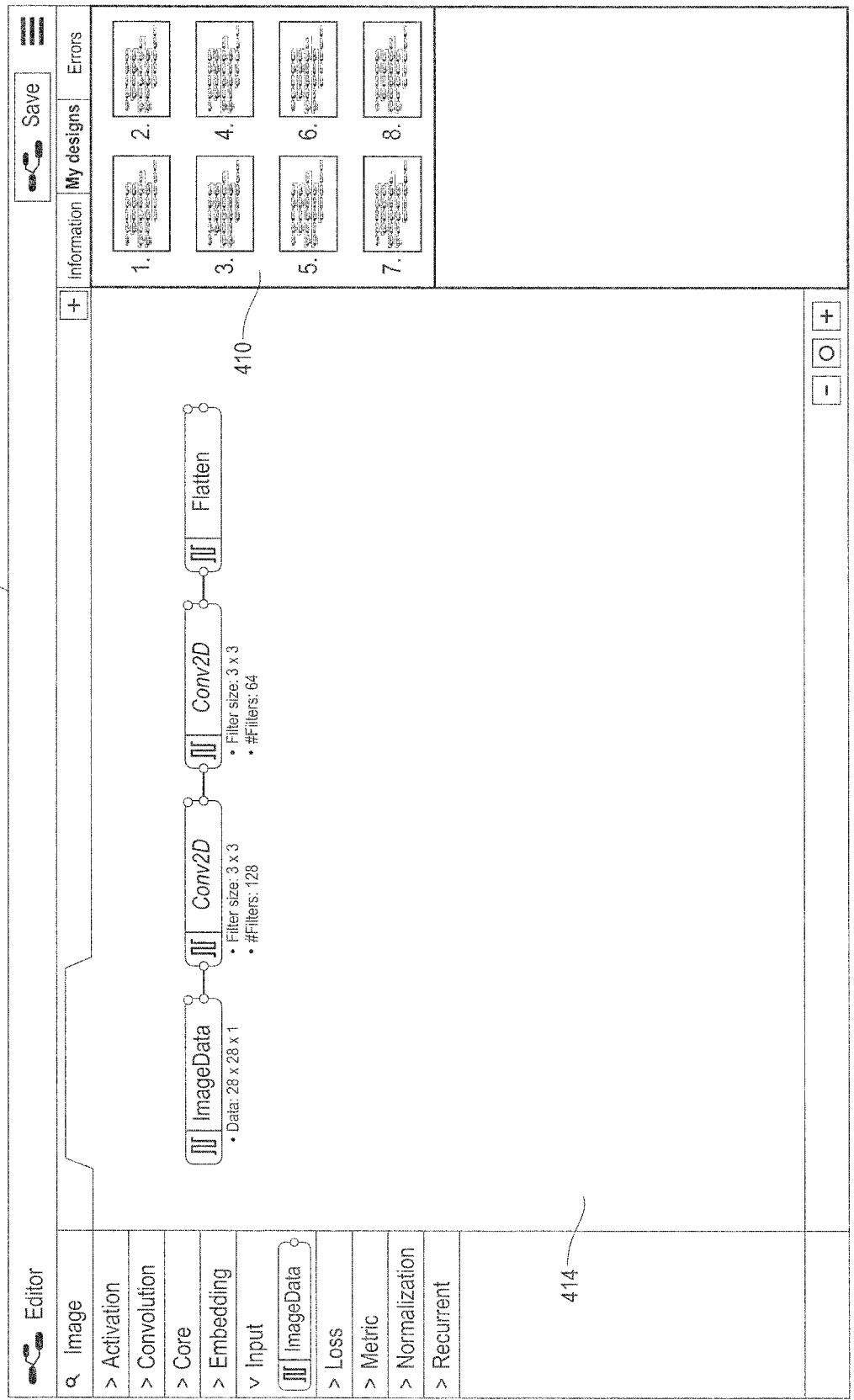

With reference now to FIG. 9, DL model generator 122 may present the sorted and ranked deep learning models to the user via GUI 400 in a similar manner to that described above for FIG. 5. For example, the deep learning models having the highest final scores may be presented, e.g., as deep learning models 1-8 in interface element 410.

Figure 10:
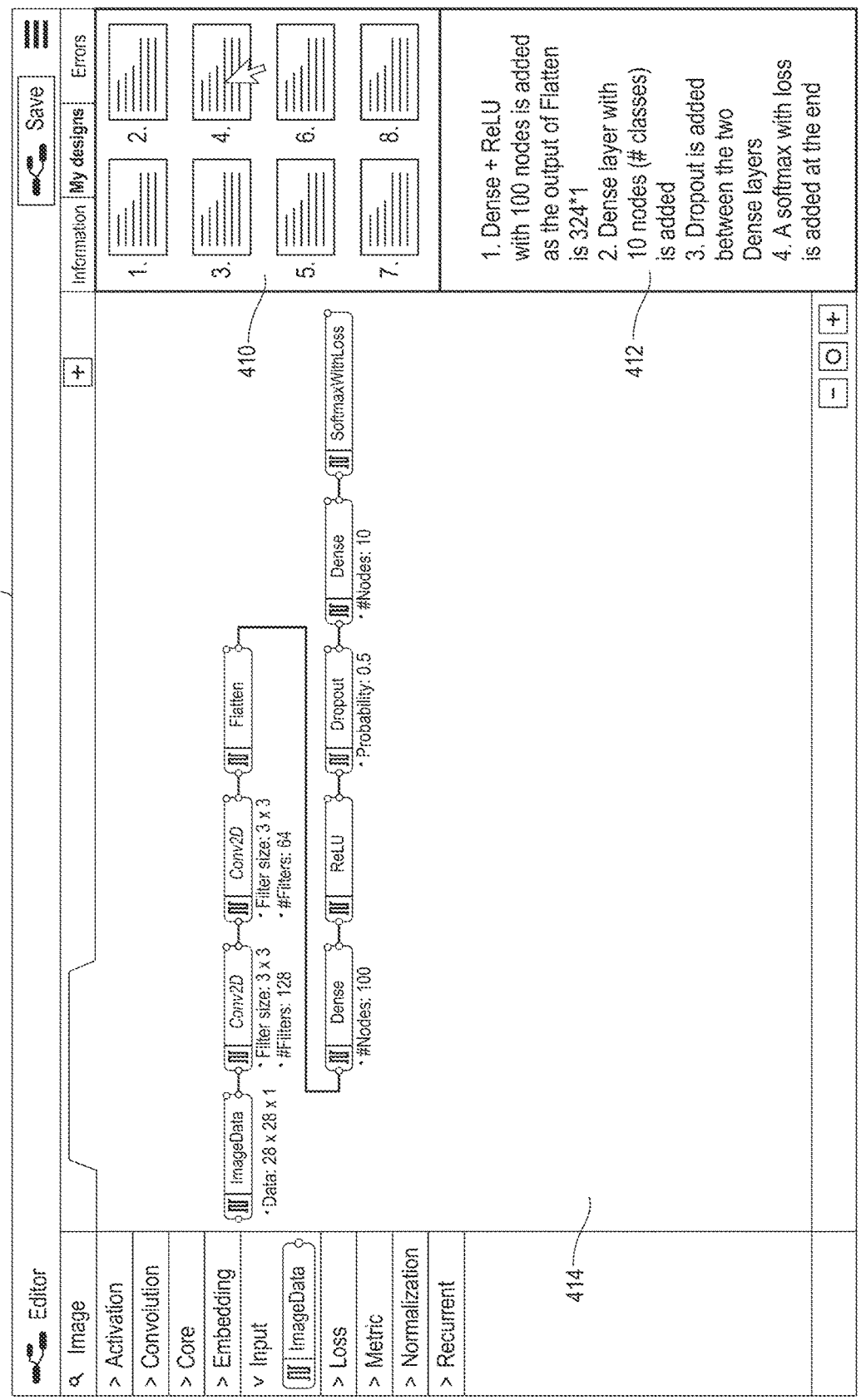

With reference now to FIG. 10, a user may activate or hover over a given deep learning model, e.g., deep learning model number 4, to see more information about the given deep learning model in a similar manner to that described above for FIG. 6. For example, information interface element 412 of GUI 400 may present the user with attributes or requirements for the given model.

In some embodiments, similar to that described above with reference to FIG. 6, when a given deep learning model is activated or hovered over in interface 410, DL model generator 122 may present an example of the components of the given deep learning model in the interface 414 of GUI 400. In the embodiment of FIG. 7, interface 414 may present each component or layer of the given deep learning model that is added to the obtained partial model as illustrated, for example in FIG. 10.

In the example of FIG. 10, recurrent or convolutional layers are not included in the completion of the partial model. For example, because the partial model already contains flatten as a layer and the output of a flatten layer is already a vector, there is no need to include recurrent or convolutional layers. In addition, where the computing device of the user may have CPU availability but no GPU availability, no reshape and conversion of the vector into a tensor, e.g., using recurrent or convolutional layers, may not be included since these layers requires more than 2 GB of GPU, which is not available on the computing device. As a further part of this example, recurrent or convolutional layers may also not be included because the correlation of the data distribution with an IRIS dataset is 0.93 where more than 94% of the models on the IRIS dataset do not contain more than 5 layers.

The techniques depicted in FIGS. 2-10 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIGS. 2-10 can be implemented via a computer program product that can include computer useable program code that is stored in a computer readable storage medium in a data processing system, wherein the computer useable program code was downloaded over a network from a remote data processing system. Also, in an embodiment of the invention, the computer program product can include computer useable program code that is stored in a computer readable storage medium in a server data processing system, wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
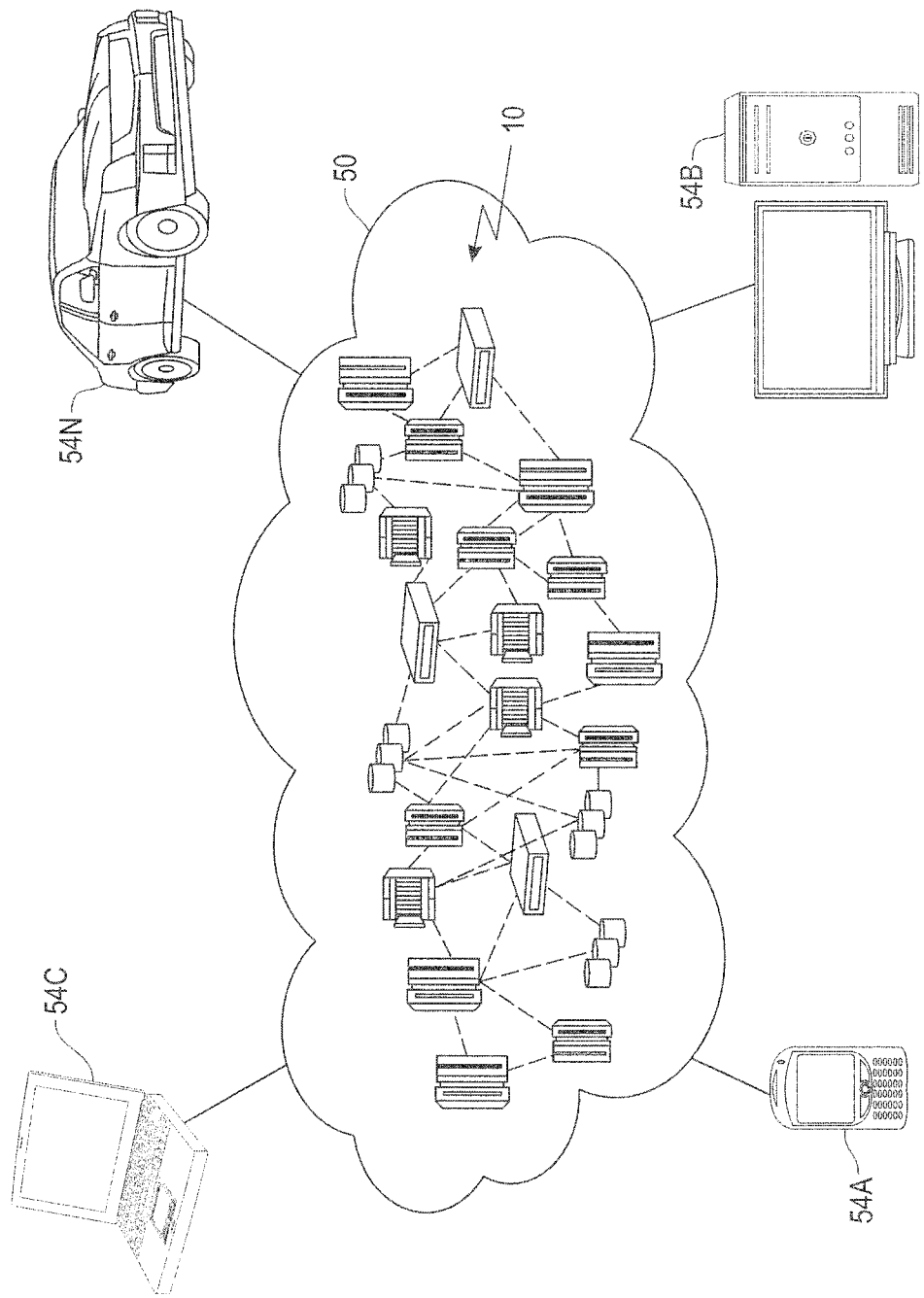
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
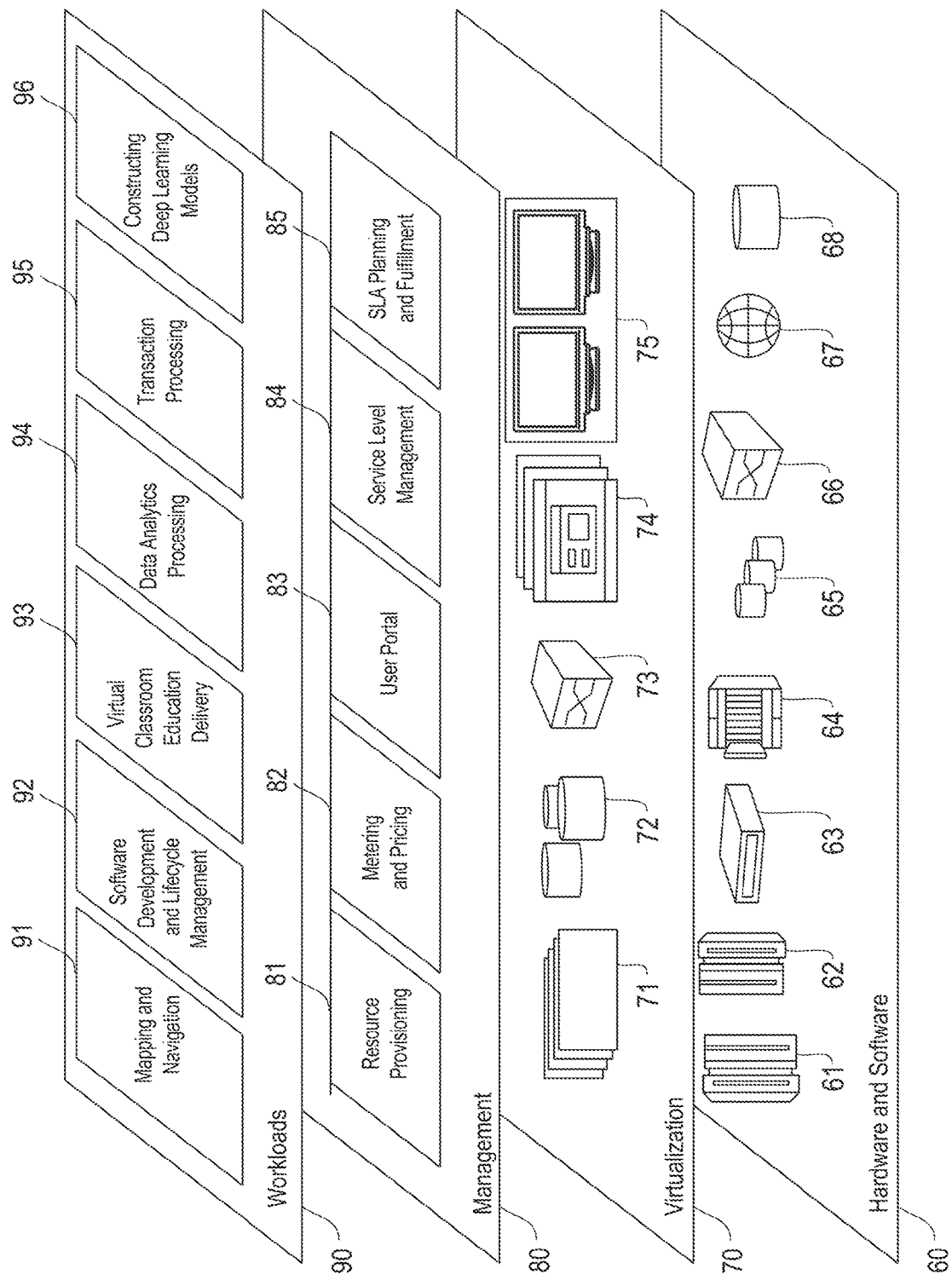
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and constructing deep learning models 96.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising steps of:
receiving a set of data and an incomplete deep learning model for the set of data;
determining at least one property of the set of data;
receiving a plurality of characteristics of a computing device associated with a user;
receiving a plurality of deep learning models from a catalog of deep learning models;
determining a score for each of the plurality of deep learning models based on (i) the received computing device characteristics and (ii) the determined at least one property of the set of data;
generating a ranked list of the plurality of deep learning models based on the determined scores;
removing one or more of the plurality of deep learning models from the ranked list based on a comparison of the plurality of deep learning models to the received incomplete deep learning model;
presenting to the user, on a display of the computing device associated with the user, (i) one or more of the deep learning models from the ranked list and (ii) one or more natural language explanations corresponding to the one or more of the deep learning models from the ranked list, each of the one or more natural language explanations comprising a description of the ranking for the corresponding deep learning model with respect to at least the set of data and the plurality of characteristics;
receiving a selection of one of the deep learning models from the user via an input device of the computing device associated with the user;

completing the incomplete deep learning model based on the selected deep learning model, wherein the completing comprises selecting one or more layers from the selected deep learning model and adding the selected one or more layers to the incomplete deep learning model, wherein the selecting is based at least in part on one or more existing layers of the incomplete deep learning model; and training the completed deep learning model using the set of data, wherein the steps are carried out by at least one computing device.

2. The computer-implemented method of claim 1, wherein said determining the score for a given deep learning model of the plurality of deep learning models comprises determining the score based on a data distribution of the given deep learning model.

3. The computer-implemented method of claim 2, wherein said determining the score for the given deep learning model comprises:

determining a first score based on the determined at least one property of the set of data, determining a second score based on the computing device characteristics, and determining a third score based on the data distribution of the given deep learning model; and combining the first, second, and third scores to generate the score for the given deep learning model.

4. The computer-implemented method of claim 3, wherein said combining the first, second, and third scores to generate the score for the given deep learning model comprises weighting each of the first, second, and third scores.

5. The computer-implemented method of claim 3, wherein said determining the score for the given deep learning model comprises performing a linear weighted regression on the combined first, second, and third scores, wherein the determined score for the given deep learning model is the output of the linear weighted regression.

6. The computer-implemented method of claim 1, wherein the plurality of characteristics of a computing device comprise one or more of an available amount of graphics processing unit (GPU) memory and an available amount of GPU processing time.

7. The computer-implemented method of claim 1, wherein the at least one property of the set of data comprises a data distribution of the data.

8. The computer-implemented method of claim 1, wherein said removing further comprises:

removing a given deep learning model from the ranked list for which the plurality of characteristics of the computing device associated with the user do not meet at least one characteristic requirement of the given deep learning model from the ranking of deep learning models to be presented to the user.

9. The computer-implemented method of claim 1, wherein the incomplete deep learning model comprises at least one of: partially written software code and a textual explanation.

10. The computer-implemented method of claim 1, wherein the comparison of the plurality of deep learning models to the received incomplete deep learning model is based at least in part on a partial graph matching algorithm.

11. A computer program product comprising a computer readable storage medium having program instructions embodied therewith, the program instructions executable by a computing device to cause the computing device to:

receive a set of data and an incomplete deep learning model for the set of data;

determine at least one property of the set of data;

receive a plurality of characteristics of a computing device associated with a user;

receive a plurality of deep learning models from a catalog of deep learning models;

determine a score for each of the plurality of deep learning models based on (i) the received computing device characteristics and (ii) the determined at least one property of the set of data;

generating a ranked list of the plurality of deep learning models based on the determined scores;

removing one or more of the plurality of deep learning models from the ranked list based on a comparison of the plurality of deep learning models to the received incomplete deep learning model;

present to the user, on a display of the computing device associated with the user, (i) one or more of the deep learning models from the ranked list and (ii) one or more natural language explanations corresponding to the one or more of the deep learning models from the ranked list, each of the one or more natural language explanations comprising a description of the ranking for the corresponding deep learning model with respect to at least the set of data and the plurality of characteristics;

receive a selection of one of the deep learning models from the user via an input device of the computing device associated with the user;

complete the incomplete deep learning model based on the selected deep learning model, wherein the completing comprises selecting one or more layers from the selected deep learning model and adding the selected one or more layers to the incomplete deep learning model, wherein the selecting is based at least in part on one or more existing layers of the incomplete deep learning model; and train the completed deep learning model using the set of data.

12. The computer program product of claim 11, wherein said determining the score for the given deep learning model comprises:

determining a first score based on the determined at least one property of the set of data, determining a second score based on the computing device characteristics, and determining a third score based on a data distribution of the given deep learning model; and combining the first, second, and third scores to generate the score for the given deep learning model.

13. The computer program product of claim 12, wherein said combining the first, second, and third scores to generate the score for the given deep learning model comprises weighting each of the first, second, and third scores.

14. The computer program product of claim 12, wherein said determining the score for the given deep learning model comprises performing a linear weighted regression on the combined first, second, and third scores, wherein the determined score for the given deep learning model is the output of the linear weighted regression.

15. The computer program product of claim 11, wherein the plurality of characteristics of a computing device comprise one or more of an available amount of graphics processing unit (GPU) memory and an available amount of GPU processing time.

16. The computer program product of claim 11, wherein said removing further comprises:

removing a given deep learning model from the ranked list for which the plurality of characteristics of the computing device associated with the user do not meet at least one characteristic requirement of the given deep learning model from the ranking of deep learning models to be presented to the user.

17. A system comprising:
a memory; and
at least one processor operably coupled to the memory and configured for:
receiving a set of data and an incomplete deep learning model for the set of data;
determining at least one property of the set of data;
receiving a plurality of characteristics of a computing device associated with a user;
receiving a plurality of deep learning models from a catalog of deep learning models;
determining a score for each of the plurality of deep learning models based on (i) the received computing device characteristics and (ii) the determined at least one property of the set of data, and (iii) the received incomplete deep learning model for the set of data;
generating a ranked list of the plurality of deep learning models based on the determined scores;
removing one or more of the plurality of deep learning models from the ranked list based on a comparison of the plurality of deep learning models to the received incomplete deep learning model;
presenting to the user, on a display of the computing device associated with the user, (i) one or more of the deep learning models from the ranked list and (ii) one or more natural language explanations corresponding to the one or more of the deep learning models from the ranked list, each of the one or more natural language explanations comprising a description of the ranking for the corresponding deep learning model with respect to at least the set of data and the plurality of characteristics;
receiving a selection of one of the deep learning models from the user via an input device of the computing device associated with the user;
completing the incomplete deep learning model based on the selected deep learning model, wherein the completing comprises selecting one or more layers from the selected deep learning model and adding the selected one or more layers to the incomplete deep learning model, wherein the selecting is based at least in part on one or more existing layers of the incomplete deep learning model; and
training the selected completed deep learning model using the set of data.

18. The system of claim 17, wherein said determining the score for a given deep learning model of the plurality of deep learning models comprises determining the score based on a data distribution of the given deep learning model.

19. The system of claim 18, wherein said determining the score for the given deep learning model comprises:
determining a first score based on the determined at least one property of the set of data, determining a second score based on the computing device characteristics, and determining a third score based on the data distribution of the given deep learning model; and
combining the first, second, and third scores to generate the score for the given deep learning model.

20. The system of claim 19, wherein said combining the first, second, and third scores to generate the score for the given deep learning model comprises weighting each of the first, second, and third scores.

* * * * *